United States Patent [19]

Maruhashi et al.

[11] Patent Number: 4,500,677
[45] Date of Patent: Feb. 19, 1985

[54] RESIN COMPOSITION EXCELLENT IN DRAWABILITY

[75] Inventors: Yoshitsugu Maruhashi; Fumio Kano, both of Yokohama; Muneki Yamada, Fujisawa; Sadao Hirata, Kamakura, all of Japan

[73] Assignee: Toyo Seikan Kaisha, Ltd., Tokyo, Japan

[21] Appl. No.: 460,757

[22] Filed: Jan. 25, 1983

[30] Foreign Application Priority Data

Jan. 29, 1982 [JP] Japan .................................. 57-11741

[51] Int. Cl.³ .................... C08L 23/08; C08L 29/04; C08L 77/00
[52] U.S. Cl. ....................................... 525/57; 525/58; 525/60; 525/179
[58] Field of Search ................... 525/57, 60, 222, 190, 525/58, 179

[56] References Cited

U.S. PATENT DOCUMENTS

| | | | |
|---|---|---|---|
| 4,228,250 | 10/1980 | Pritchett | 525/222 |
| 4,247,584 | 1/1981 | Wieliger et al. | 525/222 |
| 4,347,332 | 8/1982 | Odorzynski et al. | 525/58 |
| 4,366,288 | 12/1982 | Resz et al. | 525/60 |

FOREIGN PATENT DOCUMENTS

| | | | |
|---|---|---|---|
| 156917 | 9/1982 | German Democratic Rep. | 525/222 |
| 45-31758 | 10/1970 | Japan | 525/222 |

*Primary Examiner*—Allan M. Lieberman
*Attorney, Agent, or Firm*—Sherman & Shalloway

[57] ABSTRACT

Disclosed is a resin composition excellent in the drawability, which comprises (A) a saponified ethylene-vinyl ester copolymer having an ethylene content of 20 to 55 mole % and a saponification degree of at least 95%, (B) a saponified ethylene-vinyl ester copolymer having an ethylene content of 25 to 60 mole % and a saponification degree of at least 90%, the ethylene content of the saponified copolymer (B) being higher by at least 3 mole % than the ethylene content of the saponified copolymer (A), and (C) a polyamide, wherein the weight ratio of the saponified copolymer (A) to the saponified copolymer (B) is in the range of from 90/10 to 10/90 and the weight ratio of the sum of the saponified copolymers (A) and (B) to the polyamide (C) is in the range of from 95/5 to 5/95.

9 Claims, 2 Drawing Figures

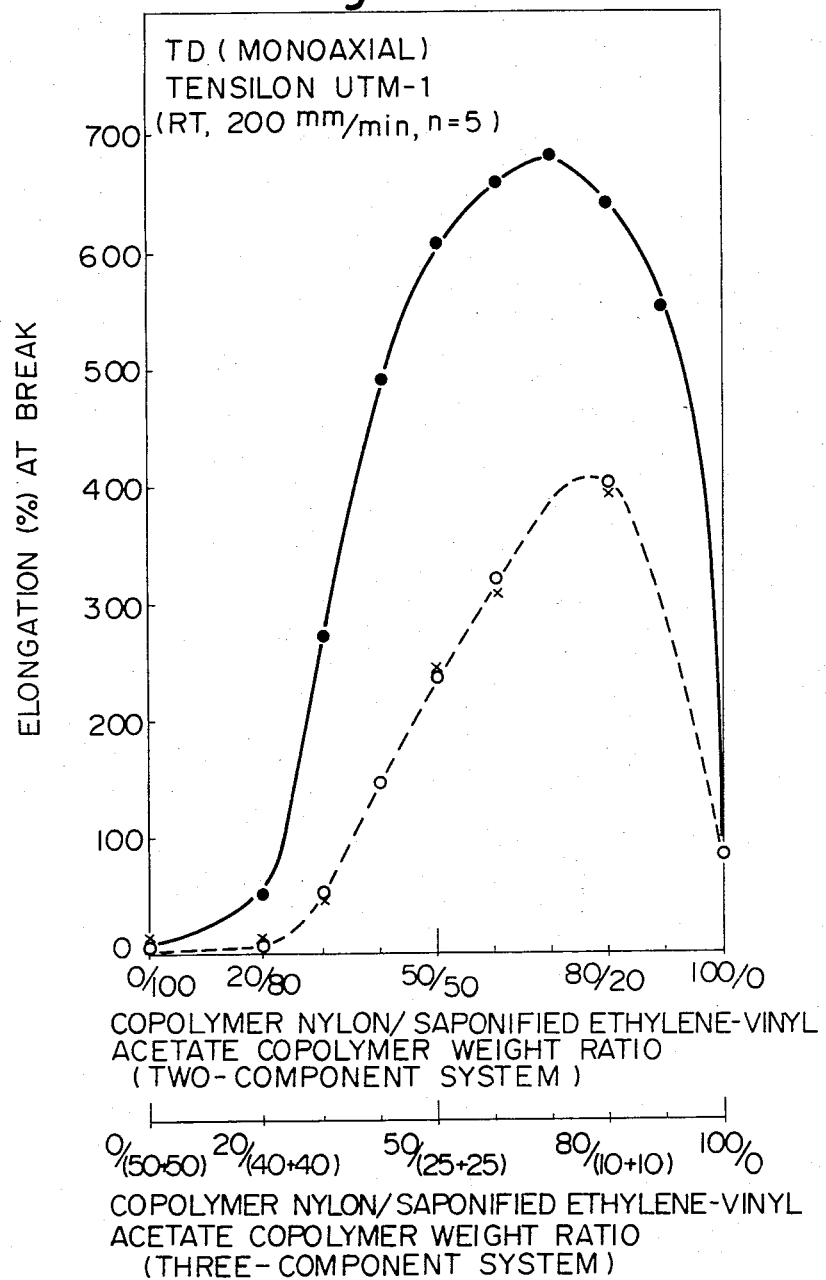

RESIN COMPOSITION EXCELLENT IN DRAWABILITY

BACKGROUND OF THE INVENTION (1) Field of the Invention

The present invention relates to a resin composition excellent in its drawability. More particularly, the present invention relates to a resin composition excellent in its drawability, which comprises two kinds of saponified ethylene-vinyl ester copolymers differing in the ethylene content and a polyamide.

(2) Description of the Prior Art

A saponified ethylene-vinyl acetate copolymer is broadly used as a heat-moldable thermoplastic resin excellent in the gas barrier property in the field of packaging vessels. However, this saponified ethylene-vinyl acetate copolymer is defective in that the elongation is low and formation of holes or breaking is readily caused in plastic processing such as draw forming, air pressure forming, plug-assist forming or draw-blow forming.

We previously proposed blending of a polyamide to a saponified ethylene-vinyl acetate for eliminating the above effect in Japanese Patent Application Laid-Open Specification No. 73966/77, and draw-blow forming of this blend was also proposed.

SUMMARY OF THE INVENTION

The present invention relates to an improvement of the drawability of saponified ethylene-vinyl acetate copolymers, and the present invention is based on the finding that if two kinds of saponified ethylene-vinyl acetate copolymers differing in the ethylene content are blended with a polyamide, the elongation at break is prominently increased over that of the above-mentioned conventional blend.

It is therefore a primary object of the present invention to provide a blend of a saponified ethylene-vinyl ester copolymer and a polyamide, which is highly improved in its drawability.

Another object of the present invention is to provide a resin composition which is excellent in its draw-forming property and gas-barrier property and is valuable as a material for production of vessels or containers by draw forming, air pressure forming, plug-assist forming or draw-blow forming.

More specifically, in accordance with the present invention, there is provided a resin composition excellent in its drawability, which comprises (A) a saponified ethylene-vinyl ester copolymer having an ethylene content of 20 to 55 mole % and a saponification degree of at least 95%, (B) a saponified ethylene-vinyl ester copolymer having an ethylene content of 25 to 60 mole % and a saponification degree of at least 90%, the ethylene content of the saponified copolymer (B) being higher by at least 3 mole % than the ethylene content of the saponified copolymer (A), and (C) a polyamide, wherein the weight ratio of the saponified copolymer (A) to the saponified copolymer (B) is in the range of from 90/10 to 10/90 and the weight ratio of the sum of the saponified copolymers (A) and (B) to the polyamide (C) is in the range of from 95/5 to 5/95.

BRIEF DESCRIPTION OF THE DRAWINGS

FIGS. 1 and 2 are graphs showing elongations at break in the machine direction (MD) and the transverse direction (TD) of films differing in the composition ratio between the saponified ethylene-vinyl acetate copolymer and copolymer nylon.

DETAILED DESCRIPTION OF THE INVENTION

Figure 1:
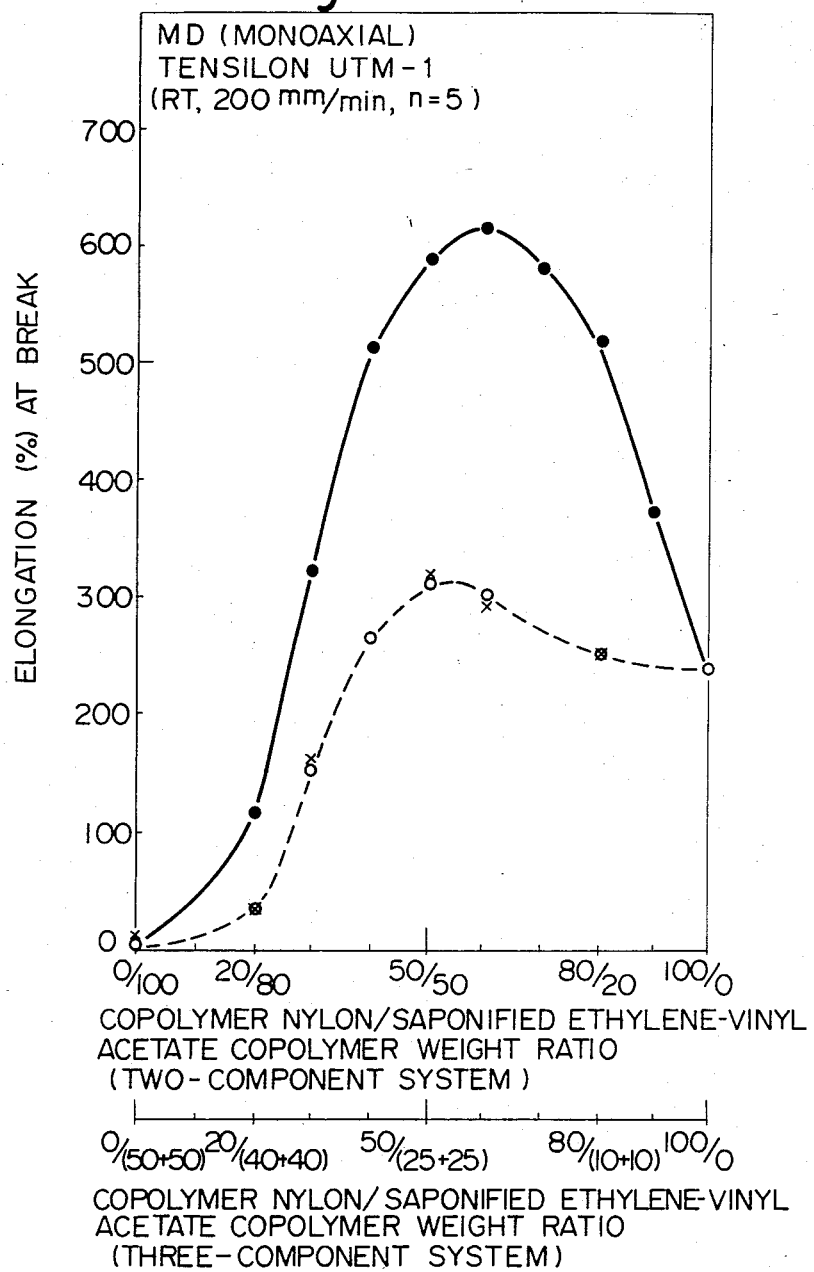

The most important feature of the present invention is that as the saponified ethylene-vinyl ester copolymer to be combined with a polyamide, two kinds of saponified ethylene-vinyl ester copolymers differing in the ethylene content are used in combination.

FIGS. 1 and 2 of the accompanying drawings show elongations at break in the machine direction and the transverse direction of films differing in the composition ratio between the saponified ethylene-vinyl acetate copolymer (often referred to as "ethylene-vinyl alcohol copolymer" hereinafter) and copolymer nylon, which are disclosed in Example 1 given hereinafter. From these FIGS. 1 and 2, it is seen that in case of the saponified ethylene-vinyl acetate copolymer, the elongation is very low but if the copolymer nylon is blended in this saponified copolymer, the elongation at break is increased to 300 to 400% at highest, and that this increase of the elongation at break in case of a saponified ethylene-vinyl acetate copolymer having an ethylene content of 30 mole % and a saponification degree of 99% (mark O) is substantially in agreement with the increase of the elongation at break in case of a saponified ethylene-vinyl acetate copolymer having an ethylene content of 41 mole % and a saponification degree of 98% (mark X).

It is surprisingly found that if the above-mentioned saponified ethylene-vinyl acetate copolymers having higher and lower ethylene contents are combined together at a weight of 50/50 and this composition is further blended with the copolymer nylon, as indicated by curves (mark) of FIGS. 1 and 2, the elongation at break is improved to a level about 2 times as high as the elongation at break attainable when the copolymer nylon is blended into the single saponified ethylene-vinyl acetate copolymer.

The reason why the elongation is prominently improved by blending a polyamide into a combination of a plurality of saponified ethylene-vinyl ester copolymers differing in the ethylene content in the present invention has not completely been elucidated. However, since combinations of a single saponified ethylene-vinyl ester copolymer and a polyamide show similar composition-elongation curves irrespectively of the ethylene content, it is apparent that the functional effect of the present invention is inherent in the above-mentioned three-component combination.

According to the present invention, since the elongation of a saponified ethylene-vinyl ester copolymer-containing resin composition can prominently be enhanced, if a film, sheet, parison or preform is subjected to plastic processing such as draw forming, air pressure forming, plug-assist forming or draw-blow forming at a high stretch or draw ratio, there can be obtained a packaging vessel having a much reduced wall thickness, in which the gas permeation resistance, mechanical strength, impact strength, rigidity, hot water resistance (retoring resistance) and transparency are highly improved by the molecular orientation.

The saponified copolymers that are used in the present invention can be obtained, for example, by saponifying a copolymer of ethylene with a vinyl ester of a lower fatty acid such as vinyl formate, vinyl acetate or vinyl propionate, especially an ethylene-vinyl acetate copolymer, according to the process disclosed in the specification of U.S. Pat. No. 3,183,203 or 3,419,654. From the viewpoints of the draw-forming property, gas barrier property and heat moldability, it is imporatnt that one saponified copolymer (A) should have an ethylene content of 20 to 55 mole %, especially 25 to 50 mole %, the other copolymer (B) should have an ethylene content of 25 to 60 mole %, especially 30 to 55 mole %, and the ethylene content of the saponified copolymer (B) should be higher by at least 3 mole %, especially at least 5 mole %, than the ethylene content of the saponified copolymer (A). More specifically, a saponified copolymer having an ethylene content lower than 20 mole % is poor in the heat moldability and thermal stability, and therefore, this saponified copolymer is not suitable for attaining the objects of the present invention. A saponified copolymer having an ethylene content higher than 60 mole % is much inferior to a saponified copolymer having an ethylene content within the range specified in the present invention in the barrier property to oxygen and the like. Even if a plurality of saponified copolymers in which the difference of the ethylene content is smaller than 3% are combined and a polyamide is blended in this combination, no prominent increase of the elongation can be expected.

The gas barrier property of the saponified ethylene-vinyl ester copolymer is greatly influenced by the degree of saponification. The degree of saponification should be at least 95% in the saponified copolymer (A) having a lower ethylene content, while the saponification degree of the copolymer (B) having a higher ethylene content may be 90% or higher.

The molecular weight of the saponified ethylene-vinyl ester copolymer (ethylene-vinyl alcohol copolymer) is not particularly critical, so far as the saponified copolymer has a film-forming molecular weight. The intrinsic viscosity $[\eta]$ of an ethylene-vinyl alcohol copolymer is ordinarily measured at a temperature of 30° C., for example, in a mixed solvent comprising 85% by weight of phenol and 15% by weight of water. In the present invention, it is preferred that ethylene-vinyl alcohol copolymers having an intrinsic viscosity $[\eta]$ of 0.07 to 0.17 l/g as measured under the above conditions be used.

A high-molecular-weight linear polyamide is used as the polyamide to be combined with the saponified ethylene-vinyl ester copolymers. The polyamide may be a homopolyamide, a copolyamide or a blend thereof. As the polyamide, there can be mentioned homopolyamides and copolyamides having the following amide recurring units, and blends thereof:

—CO—R—NH—  (1)

or

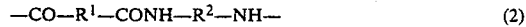

—CO—R$^1$—CONH—R$^2$—NH—  (2)

wherein each of R, R$^1$ and R$^2$ stands for a linear alkylene group.

From the viewpoint of the barrier property to such gases as oxygen and carbon dioxide gas, it is preferred that a homopolyamide or copolyamide having 3 to 30 amide groups, especially 4 to 25 amide groups, per 100 carbon atoms in the polyamide, or a blend thereof be used. As preferred examples of the homopolyamide, there can be mentioned polycapramide (nylon 6), poly-ω-aminoheptanoic acid (nylon 7), poly-ω-aminononanoic acid (nylon 9), polyundecanamide (nylon 11), polylauryllactam (nylon 12), polyethylene diamine adipamide (nylon 2,6), polytetramethylene adipamide (nylon 4,6), polyhexamethylene adipamide (nylon 6,6), polyhexamethylene sebacamide (nylon 6,10), polyhexamethylene dodecamide (nylon 6,12), polyoctamethylene adipamide (nylon 8,6), polydecamethylene adipamide (nylon 10,6) and polydodecamethylene sebacamide (nylon 10,8).

As preferred examples of the copolyamide, there can be mentioned caprolactam/lauryl lactam copolymers, caprolactam/hexamethylene diammonium adipate copolymers, lauryl lactam/hexamethylene diammonium adipate copolymers, hexamethylene diammonium adipate/hexamethylene diammonium sebacate copolymers, ethylene diammonium adipate/hexamethylene diammonium adipate copolymers and caprolactam/hexamethylene diammonium adipate/hexamethylene diammonium sebacate copolymers.

These homopolyamides and copolyamides may be used in the form of so-called blends. For example, a blend of polycaprolactam and polyhexamethylene adipamide and a blend of polycaprolactam and a caprolactam/hexamethylene diammonium adipate copolymer may be used for attaining the objects of the present invention.

A copolyamide comprising nylon 6 and nylon 6,6, especially a copolyamide comprising nylon 6 and nylon 6,6 at a weight ratio of from 99/1 to 70/30, preferably from 97/3 to 80/20, is particularly preferred as the polyamide for attaining the objects of the present invention.

The molecular weight of the polyamide is not particularly critical, so far as the polyamide has a film-forming molecular weight. However, it is ordinarily preferred that the relative viscosity ($\eta_{rel}$) of the polyamide be in the range of from 1.2 to 6.0 as measured at 20° C. with respect to a solution of 1 g of the polymer in 100 cc of 98% sulfuric acid. If a polyamide having a relative viscosity lower than 1.2 is combined with the saponified copolymers and the composition is subjected to plastic processing such as biaxial draw-blow forming, it is often difficult to obtain a molded article excellent in the mechanical strength, and a polyamide having a relative viscosity exceeding the above range is very likely poor in the melt-forming property.

In the present invention, it is important that the saponified copolymer (A) having a lower ethylene content and the saponified copolymer (B) having a higher ethylene content should be combined at an (A)/(B) weight ratio of from 90/10 to 10/90, especially from 80/20 to 20/80. If the mixing ratio is outside the above range, extreme reduction of the drawability is often observed in the final resin composition. Furthermore, the gas barrier property tends to be reduced with increase of the proportion of the saponified copolymer having a higher ethylene content. Accordingly, in order to obtain an optimum combination of the draw-forming property and the gas barrier property, it is most preferred that both the saponified copolymers be used in substantially equal amounts. From the viewpoint of the draw-forming property, it is important that both the saponified copolymers (A) and (B) and the polyamide (C) be used in such amounts that the weight ratio of the sum of the saponified copolymers (A) and (B) to the polyamide (C), that is, the (A+B)/(C) weight ratio, is in the range of from 95/5 to 5/95, particularly from 80/20 to 5/95. If the amount of the polyamide exceeds the above range or the amount of the saponified copolymers exceeds the above range, the draw-forming property tends to be reduced.

The method for blending the above-mentioned three resin components is not particularly critical. For example, a resin composition to be used for molding can easily be obtained, for example, by dry blending or melt blending. In order to prevent thermal deterioration, dry blending is preferred, and the resin components are dry-blended, supplied to a forming extruder or injection machine and kneaded by a screw of the extruder or injection machine.

Known additives such as antioxidants, antistatic agents, lubricants, ultraviolet ray absorbers, coloring materials, fillers and plasticizers may be incorporated into the resin composition of the present invention according to the known recipes.

The resin composition of the present invention can be heat-molded into a film, sheet, parison or preform in the multi-layer form or in the form of a laminate. Heat molding can be accomplished by a known molding method, for example, extrusion molding, injection molding or pre-blow molding. For forming a film in the form of a laminate, there may be adopted a method in which an extruder for the resin composition of the present invention and an extruder for other resin are used and layers of both the resins are co-extruded through a multi-ply die in such a positional relation that both the layers are adjacent to each other. As the other resin to be co-extruded with the resin composition of the present invention, there can be used low density polyethylene, medium density polyethylene, high density polyethylene, isotactic polypropylene, crystalline ethylene-propylene copolymers, ethylene-vinyl acetate copolymers, ion-crosslinked olefin copolymers, polyethylene terephthalate, polycarbonates, polystyrene, polyvinyl chloride, polyvinylidene chloride, methacrylic resins and poly-4-methylpentene-1. A laminate comprising an intermediate layer of the resin composition of the present invention and inner and outer surface layers of a humidity-resistant resin as mentioned above is especially preferred.

When the above-mentioned film or sheet is subjected to draw forming, air pressure forming or plug-assist forming at a drawing-occurring temperature, a cup-shaped vessel having the side wall portion monoaxially molecule-oriented is obtained. When the above-mentioned parison or preform is mechanically drawn in the axial direction at a drawing-occurring temperature and simultaneously blow-drawn in the peripheral direction by blowing of a fluid, a bottle-shaped vessel having the side wall portion biaxially molecule-oriented is obtained.

Since the resin composition of the present invention has a high elongation, not only hot drawing but also cold drawing can be performed, and the adaptability to the draw-forming operation is advantageously enhanced.

The present invention will now be described in detail with reference to the following Examples that by no means limit the scope of the invention.

EXAMPLE 1

A 50/50 weight ratio dry blend of an ethylene-vinyl alcohol copolymer (A) having an ethylene content of 30 mole %, a saponification degree of 99%, a vinyl alcohol content of 69 mole %, an intrinsic viscosity of 0.12 l/g and a melting point of 182° C. as measured by the differential thermal analysis method (DTA method) at a temperature-elevating rate of 10° C./min and an ethylene-vinyl alcohol copolymer (B1) having an ethylene content of 41 mole %, a saponification degree of 98%, a vinyl alcohol content of 57 mole %, an intrinsic viscosity of 0.10 l/g and a melting point of 164° C. as measured by the DTA method at a temperature-elevating rate of 10° C./min was mixed at normal temperature for 10 minutes with a caprolactam/hexamethylene diammonium adipate copolymer [copolymer nylon 6-66 (N1)] having a relative viscosity of 3.3, a caprolactam concentration of 91 mole % and a melting point of 193° C. as measured by the above-mentioned DTA method at a mixing weight ratio of from 20/80 to 90/10 by using a Henschel mixer.

For comparison, a two-component type mixture comprising the copolymer nylon (N1) and the ethylene-vinyl alcohol copolymer (A) or (B1) at a weight ratio of from 20/80 to 80/20 was prepared according to the above-mentioned method.

These mixtures and the above-mentioned single polymers, that is, the copolymer nylon N1 and the ethylene-vinyl alcohol copolymers (A) and (B1), were independently formed into sheets having a width of 150 mm and a thickness of 0.5 mm through a T-die by using an extruder having a diameter of 50 mm and an effective length of 1100 mm.

The elongation at break [(length at break)/(initial length)×100, the unit is %] of each of the obtained sheets in either the machine direction (MD, extrusion direction) or the transverse direction (TD) was measured at room temperature at a pulling speed of 200 mm/min by using a tensile tester [Tensilon Model UTM-I supplied by Toyo-Baldwin]. In each sheet, the initial length was 5.0 cm. The relation between the elongation at break of the sheet in the machine direction (MD, extrusion direction) and the mixing ratio of the component resins is shown in FIG. 1, and the results of the same measurement in the transverse direction (ID) of the sheet are shown in FIG. 2. With respect to each sheet, the measurement was made on 5 samples and the arithmetic means of the obtained data was calculated and shown. In the samples of each sheet, the relative error was within 5%.

From FIGS. 1 and 2, it is seen that the elongation at break of the three-component type mixture is much higher than those of the respective component resins and also higher than the elongation at break of the above-mentioned two-component type mixture. In short, it will readily be understood that the three-component type mixture of the present invention is excellent in the drawability.

COMPARATIVE EXAMPLE

A three-component type mixture (hereinafter referred to as "Z3") comprising the copolymer nylon 6-66 (N1) described in Example 1, the ethylene-vinyl alcohol copolymer (A) described in Example 1 and an ethylene-vinyl alcohol copolymer (B2) having an ethylene content of 32%, a saponification degree of 99%, a vinyl alcohol content of 67 mole %, an intrinsic viscosity of 0.12 l/g and a melting point of 180° C. as measured by the above-mentioned DTA method at an N1/A/B2 mixing weight ratio of 70/25/25, a two-component type mixture (hereinafter referred to as "Z2A") comprising the copolymer nylon N1 and saponified copolymer A at a weight ratio of 50/50 and a two-component type mixture (hereinafter referred to as "Z2B2") comprising the copolymer nylon N1 and saponified copolymer B2 at a weight ratio of 50/50 were independently dry-blended according to the method described in Example 1, and the mixtures were formed into sheets having the same configuration as described in Example 1 by using the same extruder and T-die as used in Example 1.

The so-obtained three sheets were subjected to the tensile test under the same conditions as described in Example 1. It was found that in case of the sheet of the mixture Z3, the elongation at break was 306% in MD and 282% in TD, in case of the sheet of the mixture Z2A, the elongation at break was 308% in MD and 281% in TD, and in case of the sheet of the mixture Z2B2, the elongation at break was 310% in MD and 279% in TD. Thus, it was confirmed that no prominent improvement of the elongation at break could be attained.

EXAMPLE 2

50% by weight of the copolymer nylon 6-66 (N1) described in Example 1 was added to 50% by weight of a dry blend comprising the two kinds of the ethylene-vinyl alcohol copolymers (A) and (B1) described in Example 1 at an (A)/(B) weight ratio of 1/4 or 4/1, and the mixture was dry-blended and melt-extruded in the same manner as described in Example 1. Thus, two kinds of sheets having the same configuration as described in Example 1 were obtained. The elongation at break of each sheet in either MD or TD was measured according to the same method as described in Example 1. The obtained results are shown in Table 1. From the results shown in Table 1, it will readily be understood that the elongations at break of the sheets of these two-component type mixtures are much higher than those of sheets of the two-components type mixtures and the elongation at break is especially high when the (A)/(B1) mixing weight ratio is about 50/50.

TABLE 1

| Mixing Ratio | Elongation (%) at Break | |
| [(A + B1)/N1] | MD | TD |
| --- | --- | --- |
| (50 + 0)/50* | 308 | 281 |
| (40 + 10)/50 | 415 | 480 |
| (25 + 25)/50* | 584 | 605 |
| (10 + 40)/50 | 357 | 502 |
| (0 + 50)/50* | 316 | 239 |

Note
*data obtained in Example 1 are shown.

EXAMPLE 3

A sheet of a three-component mixture comprising polycapramide (N2) (nylon 6) having a relative viscosity of 1.9 and a melting point of 219° C. as measured by the above-mentioned DTA method, a saponified ethylene-vinyl acetate copolymer (A) having an ethylene content 46 mole %, a saponification degree of 96%, a vinyl alcohol content of 50 mole %, an intrinsic viscosity of 0.16 l/g and a melting point of 153° C. as measured by the above-mentioned DTA method and a saponified ethylene-vinyl acetate copolymer (B) having an ethylene content of 53 mole %, a saponification degree of 93%, a vinyl alcohol content of 40 mole %, an intrinsic viscosity of 0.08 l/g and a melting point of 146° C. as measured by the above-mentioned DTA method at an N2/A/B mixing weight ratio of 40/30/30 and comparative sheets of a two-component type mixture comprising the polymers N2 and A at an N2/A mixing weight ratio of 40/60 and a two-component type mixture comprising the polymers N2 and B at an N2/B mixing weight ratio of 40/60 were prepared by performing dry-blending and melt extrusion in the same manner as described in Example 1. The elongations at break of these three sheets were measured in the same manner as described in Example 1. The obtained results are shown in Table 2. From the results shown in Table 2, it is seen that the elongation at break of the sheet of the three-component type mixture is higher than those of the sheets of the two-component type mixtures and the drawability is improved in the sheet of the three-component type mixture, though the improving effect is not so prominent as in Example 1.

TABLE 2

| Mixing Ratio | Elongation (%) at Break | |
| [(A + B)/N2] | MD | TD |
| --- | --- | --- |
| (60 + 0)40 | 186 | 68 |
| (30 + 30)/40 | 330 | 256 |
| (0 + 60)/40 | 121 | 89 |

EXAMPLE 4

Among the sheets obtained in Example 1, those shown in Table 3 were subjected to the simultaneous biaxial drawing test by using a biaxial drawing machine supplied by Iwamoto Seisakusho K.K. The drawing was carried out at a temperature of 120° C. and a drawing speed of 300 mm/min. Each sample tested had a square shape in which the initial strength of each side was 80 mm. The elongation at break ($\epsilon$, the unit is %) was calculated according to the following formula:

$$\epsilon = 100 \times ([L_t - 80]/80)$$

wherein $L_t$ stands for the length (mm) at break in the direction MD or TD where breakage first occurs.
The obtained results are shown in Table 3.

From the results shown in Table 3, it is seen that in case of biaxial drawing, as well as in case of monoaxial drawing as performed in Example 1, the elongation at break of the three-component mixture is much higher than those of the respective component resins and of the two-component type mixtures. In short, it is seen that the three-component type mixture is excellent in the drawability.

Among the sheets subjected to the biaxial drawing test, samples shown in Table 4 were drawn at a draw ratio of 200% and they were allowed to stand still at 120° for 10 minutes. The oxygen permeabilities of these drawn samples and undrawn samples as controls were determined at a temperature of 37° C. and a relative humidity of 0% by using a gas permeation tester supplied by Toyo Tester Kogyo K.K. The obtained results [data of the oxygen permeation coefficient ($PO_2$)] are shown in Table 4. From the results shown in Table 4, it is seen that in the sample of the three-component mixture, reduction of the oxygen permeation coefficient by drawing is much more prominent than in the samples of the two-component type mixtures.

TABLE 3

| Mixing Ratio [N1/(A + B)] | Elongation ($\epsilon$) (%) at Break |
| --- | --- |
| 0/(50 + 50) | 25 |
| 20/(40 + 40) | 246 |
| 50/(25 + 25) | 358 |
| 70/(15 + 15) | 472 |
| 80/(10 + 10) | 315 |

TABLE 3-continued

| Mixing Ratio [N1/(A + B)] | Elongation (ε) (%) at Break |
| --- | --- |
| 0/(100 + 0) | 27 |
| 20/(80 + 0) | 123 |
| 50/(50 + 0) | 224 |
| 80/(20 + 10) | 169 |
| 0/(0 + 100) | 25 |
| 20/(0 + 80) | 120 |
| 50/(0 + 50) | 220 |
| 80/(0 + 20) | 165 |
| 100/(0 + 0) | 146 |

TABLE 4

| Mixing Ratio [N1/(A + B1)] | $PO_2$ [cc · cm/cm² · sec · cmHg, 37° C.] | |
| --- | --- | --- |
| | undrawn sample | 200% drawn sample |
| 20/(40 + 40) | $1.53 \times 10^{-12}$ | $0.20 \times 10^{-12}$ |
| 50/(25 + 25) | $1.95 \times 10^{-12}$ | $0.31 \times 10^{-12}$ |
| 70/(15 + 15) | $2.62 \times 10^{-12}$ | $0.35 \times 10^{-12}$ |
| 80/(10 + 10) | $2.93 \times 10^{-12}$ | $0.41 \times 10^{-12}$ |
| 50/(50 + 0) | $1.16 \times 10^{-12}$ | $0.55 \times 10^{-12}$ |
| 50/(0 + 50) | $2.49 \times 10^{-12}$ | $0.62 \times 10^{-12}$ |

Note
In each of other samples, drawing at a draw ratio of up to 200% was impossible, and hence, the measurement of the oxygen permeation coefficient could not be performed.

EXAMPLE 5

A sheet having a width of 200 mm and a thickness of 1.1 mm was formed by extrusion molding by using an inner and outer layer extruder provided with a full-flighted screw having a diameter of 65 mm and an effective length of 1430 mm and a melt channel divided into two branches, an intermediate layer extruder provided with a full-flighted screw having a diameter of 50 mm and an effective length of 1100 mm, an adhesive layer extruder provided with a full-flighted screw having a diameter of 50 mm and an effective length of 1100 mm and a melt channel divided into two branches and a multiple layer-forming 5-ply T-die. Isotactic polypropylene having a density of 0.910 g/cc (ASTM D-1505), a melt index of 1.6 g/10 min (ASTM D-1238) and a melting point of 160° C. as measured by the above-mentioned DTA method was used for the inner and outer layers, and maleic anhydride-modified linear low density polyethylene (Sholex ER603N supplied by Showa Denko K.K.) having a density of 0.925 g/cc, a melt index of 3.0 g/10 min and a melting point of 120° C. as measured by the above-mentioned DTA method was used for the adhesive layers. For the intermediate layer, there were independently used the three-component mixture described in Example 1 and comprising the copolymer nylon 6-66 (N1) and the ethylene-vinyl alcohol copolymers (A) and (B1) at an N1/A/B1 mixing weight ratio of 50/25/25, the comparative two-component mixture comprising the polymers (N1) and (A) at an N1/A mixing weight ratio of 50/50, the comparative two-component mixture comprising the polymers (N1) and (B1) at an N1/B1 mixing weight ratio of 50/50, and the respective polymers (A), (B1) and N1). Thus, 6 kinds of symmetric 5-layer laminate sheets were obtained.

According to the solid phase pressure forming method reported by Mr. M. Ball at the 32nd Annual Technical Conference (held in 1974) promoted by the Society of Plastic Engineering (see page 404 of the technical paper of the above Conference), these multilayer sheets were heated at 145° C. for 20 seconds and tried to be formed into cylindrical cups having an inner diameter of 100 mm, a depth of 200 mm, a thickness of 0.5 mm and an inner volume of 1.57 l, in which the outer layer/adhesive layer/intermediate layer/adhesive layer/inner layer thickness ratio was 45/2.5/5/2.5/45.

In each of the multi-layer sheets having the intermediate layer composed of any of the component polymers alone, cracks were formed in the intermediate layer and hence, the cup became partially opaque and forming was impossible. In contrast, in case of the sheet having the intermediate layer composed of the three-component type mixture and the sheets having the intermediate layer composed of any of the two-component type mixtures, forming was possible.

For comparison, by using the cup-forming mold used in the above-mentioned method, the laminate sheet having the intermediate layer composed of the above-mentioned three-component type mixture was formed into a cylindrical cup according to the known hot forming method (air pressure forming of the molten sheet). From the result of the observation according to the polarization fluorimetry, it was confirmed that since the cup was prepared from the molten sheet by the air pressure forming method, the cup was an undrawn cup.

The oxygen permeabilities of the so-formed four laminate cups were determined according to the method for measuring the oxygen permeability of a bottle, disclosed in Japanese Patent Application Laid-Open Specification No. 49379/75, which was modified so that the oxygen permeability of a cup-like wide-mouth vessel could be measured. The obtained results are shown in Table 5.

Each of the above-mentioned laminate cups was filled with 1500 g of service water and was let to fall down from a height of 1.2 m on a concrete surface at a temperature of 20° C. With respect to each cup, 10 samples were tested. The falling strength $F_B$ was determined according to the following formula:

$$F_B = 100 \times [10 - F_1]/10$$

wherein $F_1$ stands for the number of sample cups broken at the first falling.

The obtained results are shown in Table 5.

From the results shown in Table 5, it is seen that in the laminate cup having the intermediate layer composed of the three-component type mixture, which was formed according to the above-mentioned solid phase pressure forming method, and the laminate cup obtained according to the above-mentioned hot forming method, the oxygen permeability is much lower than in the remaining two laminate cups formed according to the solid phase pressure forming method and the former two laminate cups are highly improved in the falling strength over the latter two laminate cups.

TABLE 5

| Mixing Ratio [N1/(A + B1)] | Forming Method | Oxygen Permeability (cc/m² · day · atm, 37° C.) | Falling Strength (%) |
| --- | --- | --- | --- |
| 50/(25 + 25) | solid phase pressure forming | 2.5 | 100 |
| 50/(25 + 25) | hot forming | 15 | 70 |
| 50/(50 + 0) | solid phase pressure forming | 24 | 20 |
| 50/(0 + 50) | solid phase pressure forming | 27 | 30 |

What is claimed is:

1. A resin composition excellent in the drawability, which comprises (A) a saponified ethylene-vinyl ester copolymer having an ethylene content of 20 to 55 mole % and a saponification degree of at least 95%, (B) a saponified ethylene-vinyl ester copolymer having an ethylene content of 25 to 60 mole % and a saponification degree of at least 90%, the ethylene content of the saponified copolymer (B) being higher by at least 3 mole % than the ethylene content of the saponified copolymer (A), and (C) a polyamide having a film-forming molecular weight, wherein the weight ratio of the saponified copolymer (A) to the saponified copolymer (B) is in the range of from 90/10 to 10/90 and the weight ratio of the sum of the saponified copolymers (A) and (B) to the polyamide (C) is in the range of from 95/5 to 5/95.

2. A resin composition as set forth in claim 1, wherein the saponified copolymer (A) is a saponified ethylene-vinyl ester copolymer having an ethylene content of 25 to 50 mole % and the saponified copolymer (B) is a saponified ethylene-vinyl ester copolymer having an ethylene content of 30 to 55 mole %, and the ethylene content of the saponified copolymer (B) is higher by at least 5 mole % than the ethylene content of the saponified copolymer (A).

3. A resin composition as set forth in claim 1, wherein the polyamide (C) is a homopolyamide or copolyamide having 3 to 30 amide groups per 100 carbon atoms in the polyamide, or a blend thereof.

4. A resin composition as set forth in claim 1, wherein the polyamide (C) is a copolyamide comprising nylon 6 and nylon 6,6 at a weight ratio of from 99/1 to 70/30.

5. A resin composition as set forth in claim 1, wherein the saponified copolymers (A) and (B) are contained at a weight ratio of from 80/20 to 20/80.

6. A resin composition as set forth in claim 1, wherein the weight ratio of the total amount of the saponified copolymers (A) and (B) to the amount of the polyamide (C) is in the range of from 80/20 to 5/95.

7. A resin composition as set forth in claim 1 wherein said polyamide (C) has a relative viscosity in the range of from 1.2 to 6.0 as measured at 20° C. with respect to a solution of 1 gram of the polyamide in 100 cc of 98% sulfuric acid.

8. A resin composition as set forth in claim 2 wherein the saponified copolymers (A) and (B) are contained at a weight ratio of from 80/20 to 20/80 and wherein the weight ratio of the total amount of the saponified copolymers (A) and (B) to the amount of the polyamide (C) is in the range of from 80/20 to 5/95.

9. A resin composition as set forth in claim 8 wherein the saponified copolymers (A) and (B) are contained at a weight ratio of about 50/50.

* * * * *